INVENTOR.
JAMES F. ROBINSON
BY
Meyer, Tilberry & Body
ATTORNEYS.

United States Patent Office 3,358,889
Patented Dec. 19, 1967

3,358,889
DISPENSING CONTAINER
James Frank Robinson, 19611 Battersea Blvd.,
Rocky River, Ohio 44116
Filed Feb. 6, 1967, Ser. No. 614,266
3 Claims. (Cl. 222—457)

ABSTRACT OF THE DISCLOSURE

A dispensing container having a receptacle slidably and telescopically receivable in a tubular sleeve. A hopper lid attached to the receptacle has pins which register with slots in the sleeve. Movement of the receptacle into and out of the sleeve causes the hopper lid simultaneously to close and open, respectively.

---

This invention relates to the packaging art and more particularly to a dispensing container.

The present invention constitutes an improvement in the type of dispensing container which comprises a receptacle portion slidably and telescopically receivable in a tubular sleeve. The improvement may be characterized as a novel lid arrangement which is opened, simultaneously upon withdrawal of the receptacle portion from telescopic engagement with the tubular sleeve, and is closed simultaneously upon advancement of the receptacle portion into telescopic engagement with the tubular sleeve. The lid, when opened, can also serve as a restraining hopper for the exposed contents of the container.

The present invention is particularly applicable, but not limited to dispensing containers designed to hold a plurality of small items which are withdrawn intermittently, one or a few at a time.

Thus, for instance, in one limited aspect the invention finds utility in the containment of small hardware items, foods, or pharmaceuticals. The novel lid arrangement permits the dispensing container to be manipulated with one hand, leaving the other hand free to make a selection from among its contents.

In accordance with the present invention, there is provided in a dispensing container comprising a tubular sleeve having opposed side wall portions and receptacle means slidably and telescopically receivable within the sleeve, the improvement comprising: a lid having an edge portion hinged to the receptacle means, and wing portions enveloping at least a part of each of the side wall portions of the tubular sleeve; and camming means operatively interconnecting the wing portions and the enveloped parts of the side wall portions of the tubular sleeve to limit the movement of the wings to travel along a predetermined path, whereby withdrawal of said receptacle means from telescopic engagement with said tubular sleeve, simultaneously causes said lid to open, and advancement of said receptacle means into telescopic engagement with said tubular sleeve, simultaneously causes said lid to close.

It is, therefore, an object of the invention to provide a dispensing container of improved construction.

A further object of the invention is to provide in a receptacle telescopically engaged in a tubular sleeve, a lid arrangement, which opens simultaneously upon withdrawal of the receptacle from telescopic engagement with the tubular sleeve, and closes, simultaneously upon advancement of the receptacle into telescopic engagement with the tubular sleeve.

Yet another object of the invention is to provide a dispensing container having a lid, which when opened, can also serve as a restraining hopper for the exposed contents of the box.

Figure 1:
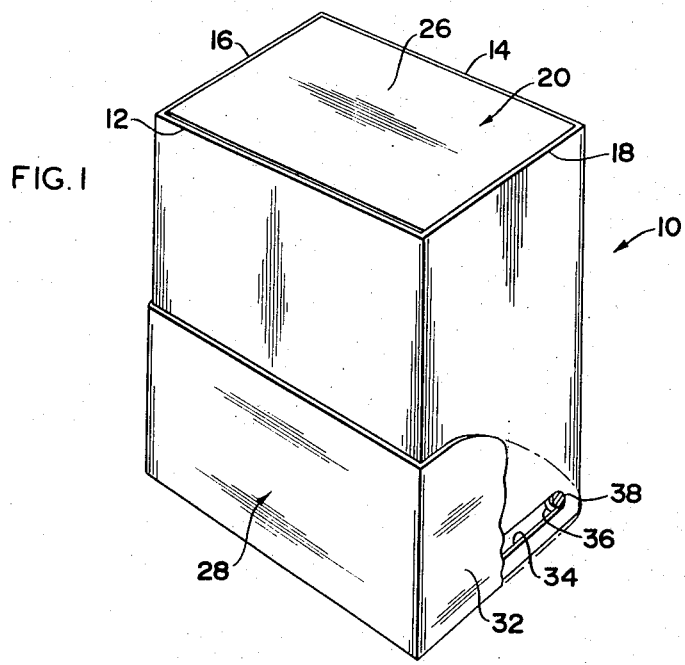
Figure 2:
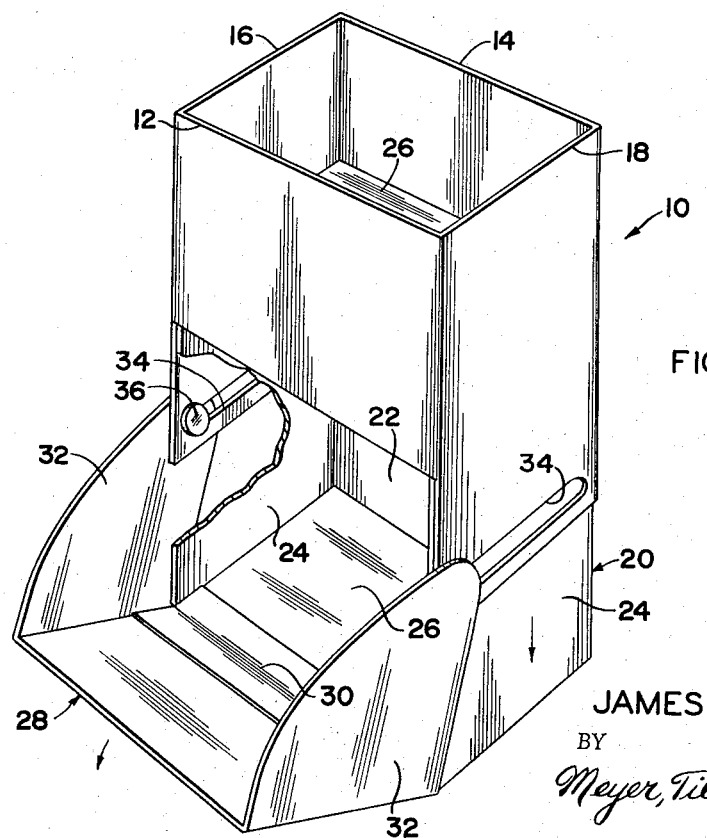

These and other objects and advantages will become apparent from the following detailed description of a preferred embodiment of the invention, when read in connection with the accompanying drawings, in which:

FIGURE 1 is a schematic, pictorial view, with parts cut away, of a preferred embodiment of the invention, showing the lid closed; and FIGURE 2 is a schematic, pictorial view, with parts cut away, of a preferred embodiment of the invention, showing the lid open.

Referring now to the drawings wherein the showings are for purposes of illustrating a preferred embodiment of the invention only, and not for the purpose of limiting the same, FIGURES 1 and 2 show a dispensing container comprising a tubular sleeve indicated generally as 10, comprising top wall portion 12, bottom wall portion 14, and opposed side wall portions 16 and 18. The dispensing container further comprises receptacle 20, having a bottom 22, side walls 24 and end walls 26.

The dispensing container is provided with a lid designated generally as 28, having an edge portion 30 hinged to end wall 26 of receptacle means 20. Lid 28 further comprises wing portions 32, one of which envelopes a part of side wall portion 16, and the other, a part of side wall 18, of tubular sleeve 10.

Operatively interconnecting wing portions 32 with the enveloped parts of side wall portions 16 and 18 are camming means. In the preferred embodiment shown in the drawing, the camming means comprise elongated follower means such as slots 34 in the enveloped parts of opposed side wall portions 16 and 18, and cam elements such as headed pins 36 connected to wing portions 32 of lid 28. Headed pins 36 have shank portions 38 received for sliding engagement in slots 34.

As receptacle means 20 is moved downwardly (as shown in the drawings) and out of telescopic engagement with tubular sleeve 10, headed pins 36 are constrained to move longitudinally to the left (as shown in the drawings) in slots 34, causing lid 28 to open. Similarly as receptacle means 20 is moved upwardly (as shown in the drawings) and into telescopic engagement with tubular sleeve 10, headed pins 36 are constrained to move longitudinally to the right (as shown in the drawings) in slots 34, causing lid 28 to close. With lid 28 in the open position, a large area of receptacle means 20 is exposed thereby, facilitating examination and selection of the contents thereof. In addition, it will be noted from FIGURE 2 that lid 28, when opened, can also serve as a restraining hopper for the exposed contents of receptacle means 20.

The present invention has been described in conjunction with certain structural embodiments; however, it is to be appreciated that various structural changes may be made in the illustrated embodiment without departing from the intended scope and spirit of the present invention as defined in the appended claims. For instance, the elements of the camming means shown in the drawings may be reversed without departing from the intended scope of the invention. Thus, wings 32 of lid 28 may be provided with slots, while the enveloped parts of opposed side wall portions 16 and 18 may be provided with cam elements such as headed pins. Other such modifications will readily suggest themselves to those skilled in the art.

Having thus described my invention, I claim:

1. In a dispensing container comprising a tubular sleeve having opposed side wall portions, and receptacle means slidably and telescopically receivable within said sleeve, the improvement comprising: a lid having an edge portion hinged to said receptacle means, and wing portions enveloping at least a part of each of the side wall portions of said tubular sleeve; and camming means operatively interconnecting said wing portions and the enveloped parts of the side wall portions of said tubular sleeve to limit the movement of said wings to travel along a predetermined path, whereby withdrawal of said receptacle means from telescopic engagement with said tubular sleeve, simultaneously causes said lid to open and advancement of said receptacle means into telescopic engagement with said tubular sleeve, simultaneously causes said lid to close.

2. The dispensing container as defined in claim 1 wherein said camming means comprises elongated follower means provided in the enveloped parts of the opposed side wall portions of said lid, and cam elements on the wing portions of said lid positioned for operative engagement with said follower means.

3. The dispensing container as defined in claim 2 wherein said elongated follower means comprise slots and said cam elements comprise headed pins having shank portions received for sliding engagement in said slots.

References Cited

UNITED STATES PATENTS

| | | | |
|---|---|---|---|
| 316,035 | 4/1885 | Hinman | 222—457 |
| 3,191,818 | 6/1965 | Farquhar et al. | 222—457 |
| 3,023,873 | 3/1962 | Horton | 221—288 X |
| 3,327,909 | 6/1967 | Parente | 222—528 X |

SAMUEL F. COLEMAN, *Primary Examiner.*